United States Patent [19]

Fischer

[11] Patent Number: 5,021,675
[45] Date of Patent: Jun. 4, 1991

[54] PHOTOELECTRIC MENSURATION DEVICE AND METHOD FOR DETERMINING PDC CUTTER WEAR

[75] Inventor: John G. Fischer, Irving, Tex.
[73] Assignee: Dresser Industries, Inc., Dallas, Tex.
[21] Appl. No.: 475,011
[22] Filed: Feb. 5, 1990
[51] Int. Cl.$^5$ .................................... G01N 21/86
[52] U.S. Cl. ................................. 250/561; 356/376
[58] Field of Search ............... 250/560, 561; 356/381, 356/376, 379, 387

[56] References Cited

U.S. PATENT DOCUMENTS

| | | | |
|---|---|---|---|
| 3,749,500 | 7/1973 | Carlson et al. | 356/387 |
| 4,708,482 | 11/1987 | Neiheisel | 356/376 |
| 4,770,590 | 9/1988 | Hugues et al. | 250/561 |

Primary Examiner—David C. Nelms
Assistant Examiner—Que Tan Le
Attorney, Agent, or Firm—Richards, Medlock & Andrews

[57] ABSTRACT

A method and apparatus for determining the amount of material removed from an irregularly shaped object is disclosed and includes a light source, a photocell positioned to receive light from the light source, the photocell having a shape which accommodates the profile of the irregularly shaped object before any material is removed and a current-measuring read-out device operatively connected to the photocell to provide an indication of the current output of the photocell. The current-measuring read-out device displays a reading indicative of the amount of material removed from the irregularly shaped object when the irregularly shaped object, with the material missing therefrom, is placed in position against the photocell so the light from the light source strikes the photocell where the material is missing. A method is also disclosed for measuring the surface area of a substantially flat, irregularly shaped object.

9 Claims, 2 Drawing Sheets

PHOTOELECTRIC MENSURATION DEVICE AND METHOD FOR DETERMINING PDC CUTTER WEAR

TECHNICAL FIELD OF THE INVENTION

This invention relates generally to a drill bit having polycrystalline diamond compact (PDC) cutter elements. More particularly, but not by way of limitation, this invention relates to apparatus for measuring and determining the amount of wear on each polycrystalline diamond compact cutter element in a drill bit.

BACKGROUND OF THE INVENTION

Although this invention is applicable for measuring the wear on various irregularly shaped objects, it has been found to be particularly useful in the environment of PDC cutter elements. Therefore, without limiting the applicability of the invention to "PDC cutter elements", the invention will be described in such environment. This invention is also applicable for measuring the surface area of various substantially flat, irregularly shaped objects.

Polycrystalline diamond compact cutter elements are readily commercially available. Round top PDC cutter elements generally comprise a cylindrical stud of tungsten carbide having an angular planar face formed at one end of the stud. A generally cylindrical wafer of tungsten carbide is brazed onto the planar face with the opposite exposed face of the wafer comprising a layer of polycrystalline diamonds. It will be appreciated that the PDC cutter elements are available in a variety of shapes other than round top, such shapes as chisel top, flat top, etc. The cutter elements may be customized to almost any shape with an electrical discharge machine.

Sophisticated computer programs are used to accurately and efficiently position the PDC cutter elements on the drill bit so that each cutter element removes a predetermined volume of rock. As the cutter elements become worn, the drill bit becomes dull and the efficiency of the drill bit decreases until the dull drill bit is replaced with a new drill bit. The dull drill bit is sent back to design and manufacturing for evaluation. Wear data from the cutter elements is used to correct and adjust the mathematical models that are used to design bits and predict wear. Wear data is also used to determine if the bit is rerunable, or if the bit can be repaired, and if so, which cutters should be replaced.

It will be appreciated that it is very important and beneficial to be able to economically and accurately determine the amount of wear on each cutter element in the drill bit not only to obtain maximum and efficient use of the drill bit in the field prior to changing out the drill bit but also in optimizing the design of the drill bit and to make consistent decisions concerning repair and rerun of bits.

The present method of attempting to determine the amount of wear on each cutter element while the drill bit is in the field is by the use of a straight edge ruler having a millimeter scale thereon to attempt to measure a wear flat. This method is not very satisfactory because the millimeter scale readability is about 1 millimeter which introduces a great amount of error. In addition, there normally is not a flat portion on the wear surface of the cutter element as there are all types of surface geometry involved with the wear surface on each cutter element. Also, the vertical height of the remaining portion of the cutter may be attempted to be measured by the ruler and the same measurement error is introduced. Therefore, it is generally recognized that the ruler method is not accurate enough to provide the data needed to modify the mathematical wear patterns and the design programs for the drill bits. Additionally, scale measurement ignores the original positioning of the cutter in relation to the body of the bit. For example, a particular design may expose only 75% (by area) of a cutter above the body of the bit. Therefore, conversion tables or graphs must be used each time a measurement is taken to determine the true wear of the cutter as a percentage of its new condition.

A more accurate method of measuring wear of cutter elements is the ink grid method. Ink is placed on the face of the cutter element and then a small piece of paper is pressed against the inked surface to transfer the shape of the face of the cutter element to the paper. The paper is placed under a grid network and the number of squares and partial squares are counted and compared to the number of squares for a new cutter element to try and determine the amount of wear to the worn cutter element.

A more accurate and expensive method of measuring wear of the cutter elements is by use of a CMM machine which includes an element that is moved along the worn surface of the cutter element and data points (6 to 8) are taken. Sophisticated computer programs convert the information from the data points into an image of the cutter element and determines the amount of wear. It takes approximately 3½ hours to do a 6¾ inch drill bit and the CMM machine is extremely capital intensive, time consuming, and expensive to use.

The present invention is portable, is relatively inexpensive, is extremely accurate and extremely fast. The wear of the cutter elements on a 6¾ inch drill bit can be determined in five minutes or less and the results will be more accurate than if the CMM machine was used. The data may be fed from this invention to a portable computer and taken back to the office.

SUMMARY OF THE INVENTION

This invention provides a method and apparatus for determining the amount of material removed from an irregularly shaped object and comprises a light source, a photocell positioned to receive light from the light source and a current-measuring read-out device operatively connected to the photocell to provide an indication of the current output of the photocell. The current-measuring read-out device displays a reading indicative of the amount of material removed from the irregularly shaped object when the irregularly shaped object, with the material missing therefrom, is placed in position against the photocell so the light from the light source strikes the photocell where the material is missing. A computer may be operatively connected to the current-measuring read-out device to receive a read-out therefrom which is indicative of the amount of material removed from the irregularly shaped object. This invention also provides a method and apparatus for measuring the surface area of a substantially flat, irregularly shaped object.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
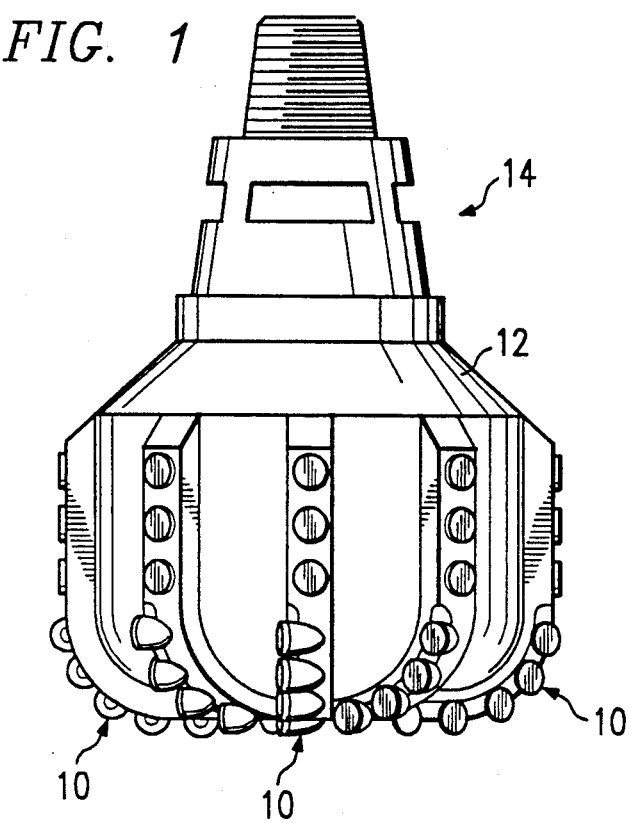
FIG. 1 is an exemplary drill bit having PDC cutter elements mounted therein.

Referring to the drawing and FIG. 1 in particular, PDC cutter elements 10 are shown mounted in the body 12 of a drill bit 14 that is shown in a simplified figuration for illustration only.

Figure 2:
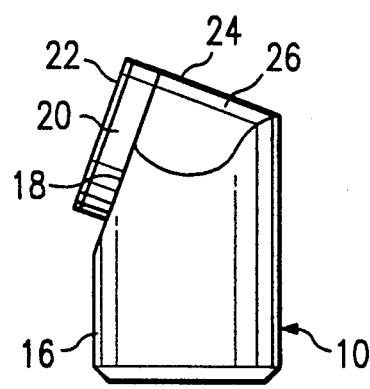
FIG. 2 is a side elevational view of a PDC cutter element.

With reference to FIG. 2, an unmounted PDC cutter element 10 is shown in a side elevational view and comprises a cylindrical stud 16 formed of a tungsten carbide material having, adjacent one end thereof, an angled planar face 18 formed thereon. A generally cylindrical portion or tungsten carbide wafer 20 having opposed planar faces is bonded, as by brazing, to the angled planar face 18 of the stud 16 along one of its faces. A layer of polycrystalline diamond material or cutting wafer 22, forming the cutting face of the cutter element 10 is bonded to the opposite face. The exterior terminal end 24 of the cylindrical stud 16 adjacent the wafer 20 is generally contoured, such as at 26 to conform generally to the outer circular circumference of the wafer 20.

Figure 3:
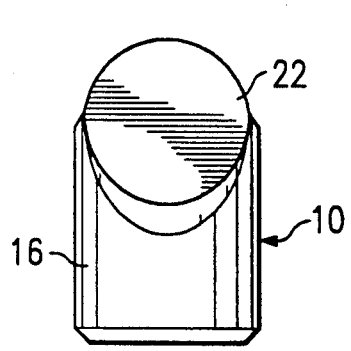
FIG. 3 is a front elevational view of a PDC cutter element.
Figure 4:
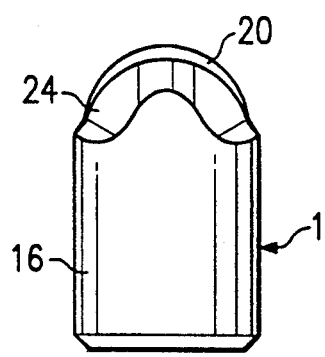
FIG. 4 is a rear elevational view of a PDC cutter element.

FIG. 3 is a front elevational view of the PDC cutter element 10, while FIG. 4 is a rear elevational view of the PDC cutter element 10. The wear which occurs on and to the PDC cutter element 10 is primarily concentrated to the upper half of the cutting wafer 22, tungsten carbide wafer 20 and exterior terminal end 24.

Figure 5:
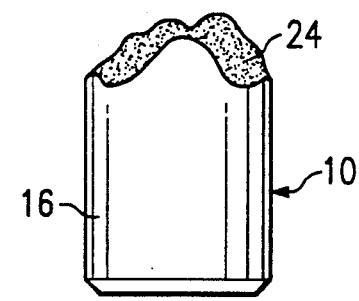
FIG. 5 is a rear elevational view of a worn PDC cutter element.
Figure 6:
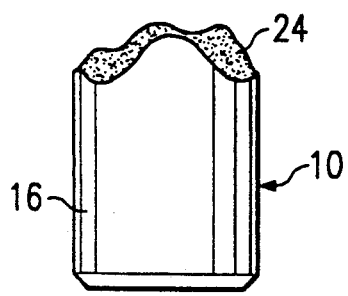
FIG. 6 is a rear elevational view of a different worn PDC cutter element.

FIGS. 5 and 6 disclose exemplary wear patterns on a PDC cutter element 10 as viewed from the rear. It will be appreciated that any attempt to measure the wear by using a ruler or the ink grid method could result in a great deal of time and less than accurate results.

Figure 7:
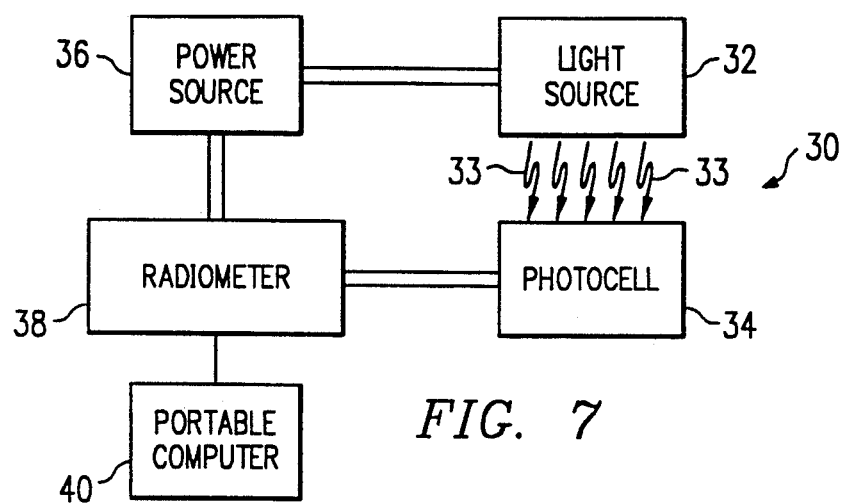
FIG. 7 is a simplified schematic, in block diagram form, of the present invention.

With reference to FIG. 7, shown therein and generally designated by the reference character 30 is a PDC cutter wear analyzer that is constructed in accordance with the invention. PDC cutter wear analyzer 30 comprises a light source 32 positioned at a constant and predetermined distance from photocell 34 and at a constant and predetermined angle with respect to the generally flat surface of photocell 34. This results in light source 32 providing a constant flux density of light energy 33 to the photocell 34. Power source 36 supplies power to light source 32 and radiometer 38 such as is available from International Light, Newburyport, Me. It will be appreciated that separate power sources may be used to provide power to light source 32 and radiometer 38. For portable use, light source 32 could be a 9 or 12 volt light bulb. The radiometer from International Light is designed to accept either a DC portable (battery) power source or the 120 volts AC from a standard electrical outlet to provide versatility regarding its operation and use. The invention can be portable and can be used in the field at the drill site as well as in the office. Radiometer 38 receives an electrical signal from photocell 34 which is proportional to the value of luminous intensity or flux density received by the photocell 34 and provides a direct visual read-out of the percent of wear on the cutter surface of the PDC cutter element 10. Radiometer 38 also provides a signal to a small portable computer 40, which signal also provides the amount of wear which has occurred to the PDC cutter element 10 such that the computer 40 may store the information for later analysis.

Figure 9:
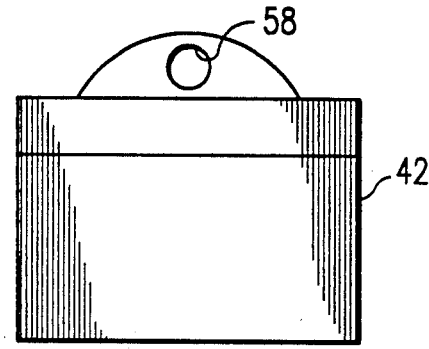
FIG. 9 is an end elevational view of the housing of the present invention.
Figure 8:
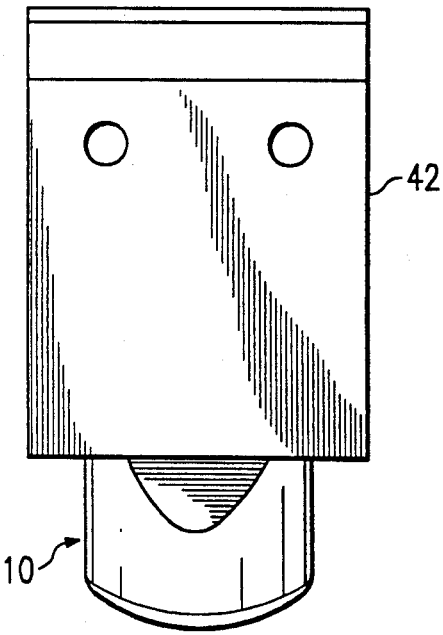
FIG. 8 is a bottom plan view of the housing of the present invention.
Figure 10:
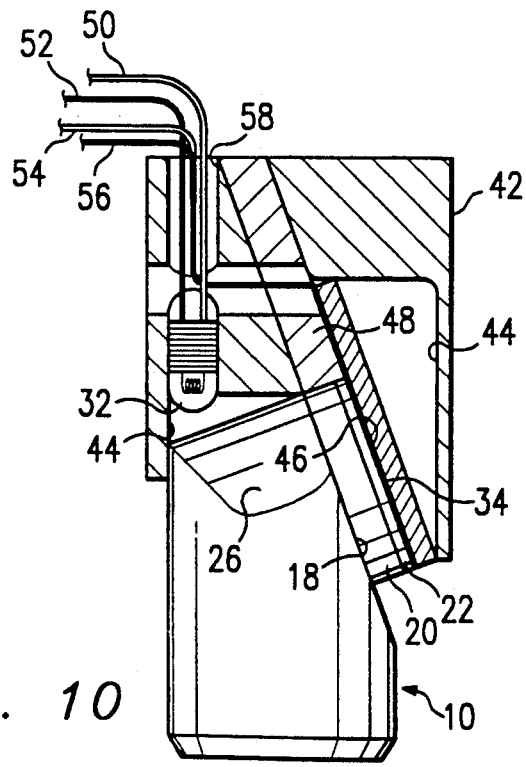
FIG. 10 is a sectional view of the hand-held analyzer constructed in accordance with the invention.

With reference to FIGS. 8-10, the PDC cutter wear analyzer 30 is contained in a hand-held fixture or housing 42. A cavity 44 is formed in one end of housing 42 into which photocell 34 is mounted. The mounting of the photocell 34 is such that the face 46 of cutting wafer 22 will rest or set flush against the surface of photocell 34 and block any light from light source 32 from reaching the photocell in the area where the face 46 contacts the surface of the photocell 34. In the areas where the face 46 does not contact the surface, if such areas exist, light from light source 32 will strike photocell 34. Bracket 48 supports and holds both photocell 34 and light source 32 within cavity 44. Bracket 48 is shaped to leave a portion of photocell 34 uncovered with the uncovered portion being of a size and shape to accommodate the face 46 of cutting wafer 22. The uncovered portion should closely approximate the size and shape of face 46 for best results. For a round top face cutter type of PDC cutter element 10, the uncovered portion of the photocell 34 would be circular in shape. It will be appreciated that it is not necessary for the geometry of the photocell 34 to exactly mirror the profile of the irregularly shaped object to be measured. One of the advantages of the invention is that it will measure a chisel shaped cutter on the same photocell 34 as will measure a round shaped cutter. The radiometer 38 will establish a zero point at any arbitrary initial light level, as well as a 100% point at any arbitrary light level within the limits of the photocell's absorption rate. It is only necessary that the surface to be placed against the photocell 34 is generally flat since photodiodes are not yet available mounted on matching curved surfaces. Light source 32 is operatively connected to power source 36 by leads 50 and 52 while photocell 34 is operatively connected to radiometer 38 by leads 54 and 56 with all leads exiting housing 42 through aperture 58.

Figure 11:
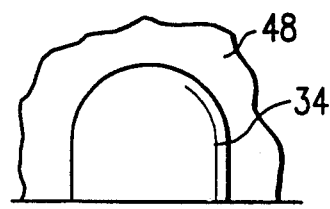
FIG. 11 is a front elevational view showing an exemplary shape of the photocell of the present invention.

With reference to FIG. 11, one example of the shape of the surface of photocell 34, which is exposed to light energy 33 when the round top face cutter type of PDC cutter element 10 is not positioned on the surface of the photocell, is disclosed. It will be appreciated that the shape of the surface of photocell 34 could be different for different shaped objects, but that is not necessary.

In operation of this invention, the invention would be calibrated for 0% wear using a new PDC cutter element 10 or one without any wear. Power from power source 36 is applied to light source 32 and radiometer 38. A new PDC cutter element 10 is inserted into cavity 44 of housing 42 and positioned as shown in FIG. 10 to cover photocell 34 and block a representative portion of light from light source 32 reaching photocell 34. The new PDC cutter element or one without any wear is considered to be the standard whose area is predetermined to represent 0% wear regardless of the amount of light, if any, which strikes photocell 34. Using the proper control on radiometer 38, the read-out from radiometer 38 is set to zero, which indicates that the amount of light, if any, striking the photocell is to be established as zero wear on the cutter element. The new PDC cutter element 10 is then removed from housing 42.

The invention would then be calibrated for 100% wear using a PDC cutter element 10 which is worn to a degree that is considered to be the standard whose area is predetermined to represent 100% wear regardless of the amount of light which strikes photocell 34. The proper control on radiometer 38 is adjusted such that the read-out from radiometer 38 is set at 100%, which indicates that the amount of light striking the photocell is to be established as 100% wear on the cutter. In the situation where the cutter element 10 was not completely exposed (e.g., 75% by area) above the body of the drill bit, then a portion of the cutter element 10 may be positioned on the photocell 34, in the invention, which portion would represent the amount of wear occurring when the cutter element was worn down to the body of the drill bit. This level of wear is determined to be the standard to represent 100% wear for a cutter element 10 with this particular amount of exposure above the body of the drill bit 13. The invention is now ready to indicate the amount of wear to each PDC cutter element 10 in the drill bit 14.

The housing is positioned over each worn PDC cutter element 10 as shown in FIG. 10 and as soon as the housing is positioned over the cutter element, the radiometer will provide a direct reading of the percent of wear of that worn PDC cutter element 10. Then, in some orderly fashion, the operator of the invention may proceed from one cutter element to the next on the drill bit 14 and determine the percent of wear for each PDC cutter element 10. If the computer (portable, desk top or main frame) is connected to radiometer 38, the read-out from radiometer 38 will be transferred to the computer.

Radiometer 38 has the capability of providing a reciprocal read-out which would provide an indication of the percentage of the cutter element which remains (not worn away). Therefore, the invention can be used to determine the surface area of a substantially flat, irregularly shaped object. First, the invention would be calibrated using an object whose area is known and this would be the standard against which the object with unknown surface area would be measured. An object whose surface area is known, e.g., one square inch, is positioned against photocell 34. Using the proper control on radiometer 38, the read-out from radiometer 38 is set at 100%. The standard whose area is known is removed and with light from light source 32 falling on all the surface of photocell 34, the proper control on radiometer 38 is adjusted such that the read-out from radiometer 38 is set at 0% which indicates zero area. The substantially flat, irregularly shaped object, whose surface area is unknown, is then placed against the surface of photocell 34 and the read-out from the radiometer 38 indicates the surface area of the substantially flat, irregularly shaped object as a percent of the standard whose area is known.

It will be appreciated that the present invention provides a portable hand-held unit, which is inexpensive, extremely accurate and extremely fast that utilizes the sensitivity of a photocell to luminous intensity to directly measure the percent wear to a PDC cutter element in a drill bit. The invention incorporates a source of constant luminosity at a constant distance and angular disposition to the photocell. This equates to a constant flux density supplied to the photocell. The photocell is then shadowed by an irregularly shaped object which blocks a portion of the light directed toward the photocell. The change in electrical current from the photocell is determined to be proportional to the area of the photocell which was blocked from receiving light. This provides a very fast and very accurate means of determining the area of an irregularly shaped object in two dimensions by providing the percentage of light which reaches the photocell. Filters and light sources may be varied to improve accuracy if the readings appear to be affected by ambient light.

Although the present invention has been described with reference to a presently preferred embodiment, it will be appreciated by those skilled in the art that various modifications, alternatives, variations, etc., may be made without departing from the spirit and scope of the invention as defined in the appended claims.

I claim:

1. A method of determining the amount of material removed from an irregularly shaped object, said method comprising the steps of:
   providing a light source;
   providing a photocell positioned to receive light from said light source, said photocell having a shape which accommodates the profile of the irregularly shaped object before any material is removed from said irregularly shaped object;
   providing a current-measuring read-out device operatively connected to said photocell to provide an indication of the current output of the photocell;
   calibrating said current-measuring read-out device to display a reading of zero when a standard object whose area is predetermined to represent 0% removal of material is placed against said photocell to block light from said light source;
   calibrating said current-measuring read-out device to display a reading of 100% when a standard object whose area is predetermined to represent 100% removal of material is placed against said photocell to block light from said light source;
   placing an irregularly shaped object having material removed therefrom against said photocell to block the light from said light source by the irregularly shaped object; and
   noting the value of the displayed reading on the current-measuring read-out device, said value of the displayed reading providing an indication of the amount of material removed from said irregularly shaped object.

2. The method of claim 1 wherein said irregularly shaped object comprises a PDC cutter element.

3. A method of determining the surface area of a substantially flat, irregularly shaped object, said method comprising the steps of:
   providing a light source;
   providing a photocell positioned to receive light from said light source, said photocell having a shape which accommodates the profile of the substantially flat, irregularly shaped object;
   providing a current-measuring read-out device operatively connected to said photocell to provide an indication of the current output of the photocell;

calibrating said current-measuring read-out device to display a reading of 100% when a standard object whose area is known is placed against said photocell to block light from said light source;

calibrating said current-measuring read-out device to display a reading of zero when all of said photocell is exposed to the light from said light source;

placing a substantially flat, irregularly shaped object of unknown surface area against said photocell to block the light from said light source; and noting the value of the displayed reading on the current-measuring read-out device, said value of the displayed reading providing an indication of the surface area of the substantially flat, irregularly shaped object as a percentage of the area of the standard object whose area is known.

4. An apparatus for determining the amount of material removed from an irregularly shaped object, said apparatus comprising:

a housing having a cavity formed therein;

a light source positioned in said cavity at a predetermined location;

a photocell positioned in said cavity to receive light from said light source, said photocell having a shape which accommodates the profile of the irregularly shaped object before any material was removed from said irregularly shaped object;

a current-measuring read-out device operatively connected to said photocell to provide an indication of the current output of the photocell;

whereby said current-measuring read-out device displays a reading indicative of the amount of material removed from the irregularly shaped object when said irregularly shaped object, with material missing therefrom, is placed in position against and on the photocell so that light from the light source strikes the photocell where the material is missing from the irregularly shaped object and the light is blocked from striking the photocell by the irregularly shaped object where material is not missing.

5. The apparatus of claim 4 wherein said irregularly shaped object comprises a PDC cutter element.

6. The apparatus of claim 4 further including a power supply operatively connected to said light source and said current-measuring read-out device.

7. The apparatus of claim 6 wherein said power supply is portable.

8. The apparatus of claim 4 further including a computer operatively connected to said current-measuring read-out device to receive a read-out therefrom.

9. The apparatus of claim 8 wherein said computer is portable.

* * * * *